United States Patent
Zadeh

(10) Patent No.: US 6,324,406 B1
(45) Date of Patent: *Nov. 27, 2001

(54) MOBILE STATION LOCATION DETERMINATION USING RADIO SIGNAL TIMING VALUES

(75) Inventor: Bagher Rouhollah Zadeh, Dallas, TX (US)

(73) Assignee: Ericsson Inc., Richardson, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/067,486

(22) Filed: Apr. 27, 1998

(51) Int. Cl.[7] ............... H04Q 7/20; H04B 7/00
(52) U.S. Cl. ............ 455/456; 455/437; 455/525; 370/332
(58) Field of Search .................. 455/436, 437, 455/456, 67.6, 502, 525; 370/331, 332, 350, 347, 442, 503

(56) References Cited

U.S. PATENT DOCUMENTS

| | | | |
|---|---|---|---|
| 5,293,645 | * 3/1994 | Sood | 455/456 |
| 5,613,205 | 3/1997 | Dufour | 455/440 |
| 5,629,710 | * 5/1997 | Sawada | 455/456 |
| 5,634,192 | * 5/1997 | Meche et al. | 455/437 |
| 5,640,676 | * 6/1997 | Garncarz et al. | 455/436 |
| 5,657,487 | * 8/1997 | Doner | 455/456 |
| 6,006,097 | * 12/1999 | Hornfeldt et al. | 455/456 |
| 6,029,070 | * 2/2000 | Kingdon et al. | 455/456 |
| 6,031,490 | * 2/2000 | Forssen et al. | 455/456 |
| 6,061,565 | * 5/2000 | Innes et al. | 455/436 |

FOREIGN PATENT DOCUMENTS

| | | |
|---|---|---|
| 0 800 319 A1 | 10/1997 | (EP) . |
| WO 98/04094 | 1/1998 | (WO) . |

OTHER PUBLICATIONS

ETSI TC–SMG: "European Digital Cellular Telecommunications System (Phase 2); Radio Subsystem Link Control (GSM 05.08)", European Telecommunication Standard, Jul. 1, 1994 pp. 1–5, 07–35.

* cited by examiner

Primary Examiner—Vivian Chang
Assistant Examiner—Eliseo Ramos-Feliciano
(74) Attorney, Agent, or Firm—Arthur I. Navarro

(57) ABSTRACT

A method for collecting radio signal timing values for use in determining the location of a mobile station in a wireless network. The method includes acquiring a radio signal timing value from the mobile station's serving base transceiver station. A first handover of the mobile station is initiated from the serving base transceiver station to a second base transceiver station. A radio signal timing value is determined as part of the handover procedure. After the first handover is completed, a second handover of the mobile station is initiated from the second base transceiver station to a third base transceiver station, wherein a third timing value is determined as part of the handover procedure. The second handover is also completed.

12 Claims, 3 Drawing Sheets

MOBILE STATION LOCATION DETERMINATION USING RADIO SIGNAL TIMING VALUES

TECHNICAL FIELD OF THE INVENTION

This invention relates to the field of wireless telephony, and, more specifically, to a method for obtaining radio signal timing values for determining the location of a mobile station in a wireless network without degrading call quality or dropping the call.

BACKGROUND OF THE INVENTION

Several of the features and services of both wireline and wireless telephones are based on the location of the telephone. For example, a public safety ("911") system directs aid to the caller at the location of the calling telephone. Such systems function without the caller having to identify the location (an important feature for a person unfamiliar with the area or unable to speak to the public safety personnel). The location of a wireline telephone in relation to the wireline network is static; the location of the telephone is simply the point where the telephone is connected to the network. In contrast, a mobile station by definition has a dynamic relationship with locations in its wireless network; therefore, determining its position is more difficult.

In order to locate a mobile station with a high degree of accuracy, measurements of the distances of the mobile station from at least three fixed points are needed. The distance measurements are used in a triangulation algorithm to calculate a position relative to the fixed points. In wireless networks based on the Global System for Mobile communication (GSM) standard, obtaining the distance measurement to make a location determination is relatively straightforward.

In a GSM wireless network, a mobile station's location is derived from the time of arrival of the mobile station's radio signal at different base transceiver stations (BTS's). Since the locations of the BTS's are known, the location of the mobile station is calculated to a relatively high degree of accuracy. The timing values are readily available because of the manner in which the GSM standard specifies multiplexing of mobile stations on a given radio frequency.

A GSM-based mobile station shares a radio frequency with other mobile stations by broadcasting only during a time slot assigned to it by its serving BTS. However, even if the mobile station broadcasts precisely during its time slot, the BTS does not always receive the mobile station's transmission during the time slot because of propagation delays, which are due to the distance the signal travels. To compensate for the propagation delay, the BTS subtracts the time of arrival from the time offset of the time slot to derive a timing advance (TA) value. The TA value is sent to the mobile station, which "advances" its transmission by that amount, so that the transmission arrives at the BTS during the mobile station's time slot. Given that the speed of radio signal propagation is known (the speed of light), the TA value times the speed of light is the distance between the mobile station and the BTS.

The TA value from the serving BTS is always known, because that is the TA that the mobile station is currently using. In order to determine the location of the mobile station, at least two more TA values from two neighboring BTS's need to be acquired. In the current art, these TA values are acquired by performing "positioning handovers."

According to the current method for performing a positioning handover, the mobile station sends a handover access message to a second BTS. The second BTS calculates the TA value but does not respond to the mobile station. Such lack of response simulates a failed handover and the mobile station takes action as in a normal handover failure; that is, it returns to the previous channel on the original BTS after a predefined time period. In GSM, the predefined time period is 320 ms for a traffic channel supporting voice or data, and 675 ms for a stand-alone dedicated control channel supporting short message service. A second positioning handover is then performed to a different BTS, and so forth, in order to obtain an optimal number of TA values.

The collection of TA information using this method degrades call quality. For each location determination, at least two positioning handovers are performed. Consequently, the user of the mobile station experiences at least two perceptible speech interruptions, or perceptible delays in receiving messages. Furthermore, because the current positioning handover method simulates failed handovers, there is always a risk that the mobile station will not return to the previous channel successfully and thus the call is dropped. Therefore, there is a problem in the art in collecting timing advance values for use in determining the location of a mobile station without disrupting an extant call.

SUMMARY OF THE INVENTION

This problem is solved and a technical advance is achieved in the art by a method for collecting timing values in order to determine the location of a mobile station in a wireless network. The serving base transceiver station (BTS) already has a first timing value, namely the timing advance (TA) value. A second TA value is obtained by the base station controller (BSC) controlling the serving BTS to cause a complete handover of the mobile station from the serving BTS to a first BTS. The first BTS calculates a TA value as part of the handover process, and this TA value is collected. After this handover is completed, another handover is initiated. In one exemplary embodiment, the mobile station is handed over from the first BTS back to the original serving BTS, wherein the BSC has advantageously reserved the original communication channel for this purpose. After the handover is completed, the original serving BTS hands over the mobile station to a second BTS. This second BTS calculates a TA value as part of the handover process and this TA value is collected. This handover is also completed.

In a second embodiment, the mobile station is handed over directly from the first BTS to a second BTS. This second BTS derives its TA values as part of the handover process and this TA value is collected. This handover is also completed. In both the first and second embodiments, further handovers may be performed to obtain more TA values if desired. Advantageously, the mobile station's handover candidate list is examined to determine BTS's for the handovers. Further, it is advantageous to wait a period of time between handovers to prevent successive short handover interruptions. By these methods, sufficient TA values are obtained to calculate the location of the mobile station, while the mobile station experiences minimal call disruption as compared to the failed handover method, and there is less of a chance of the call being lost, because full, stable handovers are performed. Additionally, the total time for making a positioning determination is reduced.

BRIEF DESCRIPTION OF THE DRAWINGS

A more complete understanding of this invention may be obtained from a consideration of the following detailed description in conjunction with the drawings in which.

DETAILED DESCRIPTION

Figure 1:
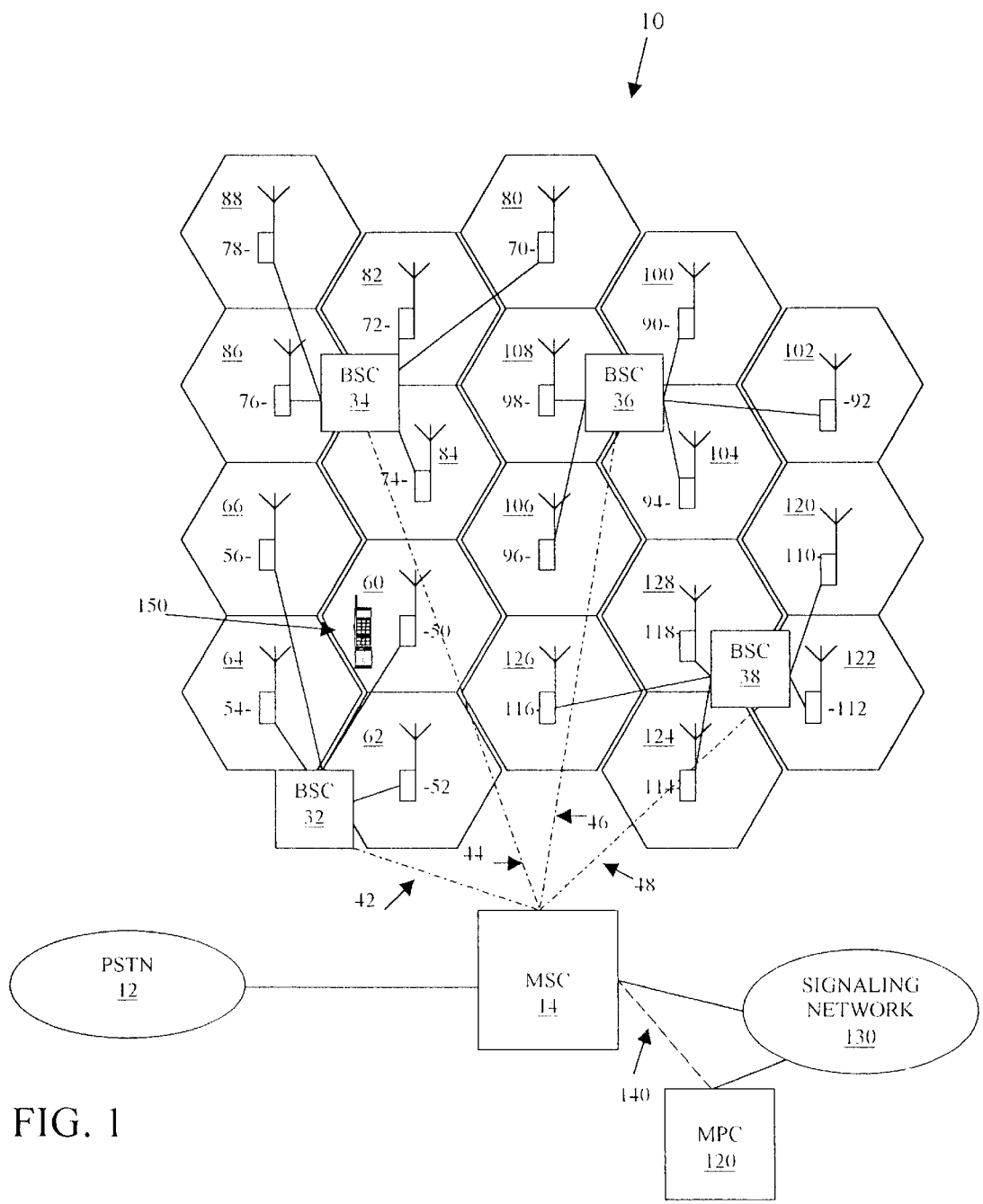
FIG. 1 is a block diagram of a wireless network in which my new method for obtaining a plurality of radio signal timing values may be practiced.

This method for obtaining a plurality of radio signal timing values will be described in connection with a GSM wireless network. However, any wireless network that calculates signal propagation times (e.g., time-division, multiple access; code-division, multiple access) can utilize this method. FIG. 1 illustrates a typical GSM wireless network in which a method for obtaining a plurality of radio signal timing measurements may be practiced. Wireless network 10 is connected to the public switched telephone network (PSTN) 12, which comprises a plurality of other wireless and landline networks. PSTN 12 is connected to wireless network 10 at mobile switching center (MSC). MSC 14 controls the connection of calls between PSTN 12 and mobile stations in wireless network 10, and controls the connection of calls between mobile stations in wireless network 10.

In order to provide service throughout wireless network 10, MSC 14 is connected to a plurality of base station controllers (BSC) 32, 34, 36, and 38 via trunks 42, 44, 46, and 48, respectively. BSC's 32, 34, 36 and 38 each control a plurality of base transceiver stations (BTS's) in order to connect and control mobile stations operating in the area, as will be described further below. In this exemplary network, BSC 32 coordinates the actions of BTS's 50, 52, 54 and 56. In turn, each of these BTS's provide radio communications and radio communications management for all mobile stations in its respective coverage area or "cell" 60, 62, 64, and 66. In this figure, all cells are shown as interlocking hexagons. In a typical wireless network, cells are irregularly shaped, overlapping areas, whose shapes are dependent upon the features of the terrain.

BSC 34 coordinates BTS's 70, 72, 74, 76, and 78, which provide radio communications and radio communications control for mobile stations in cells 80, 82, 84, 86, and 88. BSC 36 coordinates BTS's 90, 92, 94, 96, and 98, which provide radio communications and radio communications control to mobile stations in cells 100, 102, 104, 106, and 108. Finally, BSC 36 coordinates BTS's 110, 112, 114, 116, and 1 18, which provide radio communications and radio communications control to mobile stations in cells 120, 122, 124, 126, and 128.

Mobile station 150 is moving about in wireless network 10. In FIG. 1, mobile station 150 is located in cell 60, wherein BTS 50 is the "serving" BTS; that is, mobile station 150 is in radio communication with and under the control of BTS 50. When mobile station 150 moves into an adjacent cell, such as cell 64, the serving BTS of mobile station 150 is changed; the mobile station is "handed over" from BTS 50 to BTS 54.

To facilitate such handovers, BSC 32 regularly causes mobile station 150 to make a number of signal quality tests on the radio channel connection between BTS 50 and mobile station 150, and develops a handover candidate list. The handover candidate list identifies BTS's that have a measurable radio signal at mobile station 150. Signal quality measurements are collected and used to determine when a handover is needed and which BTS is the best candidate for handover.

In some wireless networks, a central mobile positioning center (MPC) 20 has the task of determining the location of a mobile station relative to the wireless network. In FIG. 1, MPC 20 is connected to MSC 14 through a signaling network 130. Alternatively, MPC 20 may be directly connected to MSC 14, as shown in dashed line 140. MPC 20 has a record of the location of all BTS's within wireless network 10. MPC 20 derives the location of mobile station 150 by utilizing the Timing Advance (TA) values from at least three BTS's to calculate the distances between mobile station 150 and the BTS's. MPC 20 uses the geographical coordinates of the BTS's and the calculated distances between the mobile station and the BTS's to derive the location of the mobile station.

When the location of mobile station 150 is required (by a public safety system, for example), MPC 20 sends a request for TA values to MSC 14. MSC 14 forwards the request to BSC 32, which is connected to the serving BTS 50. BSC 32 obtains the TA value from serving BTS 50. BSC 32 uses the hand over candidate list of mobile station 150 to determine which BTS's to obtain further TA values from. BTS's 54, 56 and 52 are on the handover candidate list (in that order, ranked from best candidate to poorest candidate for handover). BSC 32 causes mobile station 150 to initiate a first handover to BTS 54 (the best candidate on the handover candidate list), and reserves the current communication channel. BTS 54 generates a TA value as part of the handover procedure. This handover, as contrasted with the prior art, is fully completed so that mobile station 150 has an established, stable radio link to BTS 54. After the handover to BTS 54 is completed, BSC 32 causes mobile station 150 to initiate a handover back to serving BTS 50, on the reserved channel. This handover is also completed. A handover back to the original serving BTS facilitates stability of any voice or data call, because there was previously a stable link to mobile station 150. This method further facilitates a handover back to the previous stable radio link if the handover to BTS 54 is unsuccessful for any reason.

After the return handover is completed, the system advantageously waits a period of time (e.g., 480 ms) so that the user of mobile station 150 does not experience a series of short disruptions in service. BSC 32 initiates a second handover to BTS 56, wherein BTS 56 generates another TA value as part of the handover procedure. This handover is also completed. Having obtained three TA values, BSC 32 sends the TA values to MSC 14 along with the BTS's identities. MSC 14 sends this information to MPC 20, which makes the location determination based on the information.

In another embodiment of the method, a first TA value is obtained from serving BTS 50 and mobile station 150 is handed over to BTS 54, as above, wherein the second TA value is generated. After this first handover is completed, BSC 32 initiates a handover to BTS 56, which generates another TA value. This handover is also completed. Having obtained three TA values, BSC 32 sends the TA values to MSC 14 along with the cell's global identity. MSC 14 sends this information to MPC 20, which makes the location determination based on the information. This second method is faster than the first method, because the mobile station is not handed back to the original serving BTS, but is less secure than that method. However, it is still more secure than the prior art because the handovers are completed.

By use of the methods, lengthy failed handover interruptions (more than 320 ms) are avoided. Only normal handover delay (approximately 100 ms) is encountered, thus reducing the disruption of telephone conversations or data transmissions to a minimum. Furthermore, there is less of a chance of the call being dropped because each handover is completed, whereas incomplete handovers may fail to return the mobile station to the original serving BTS. Additionally, the total time for acquiring timing values is reduced.

Figure 2:
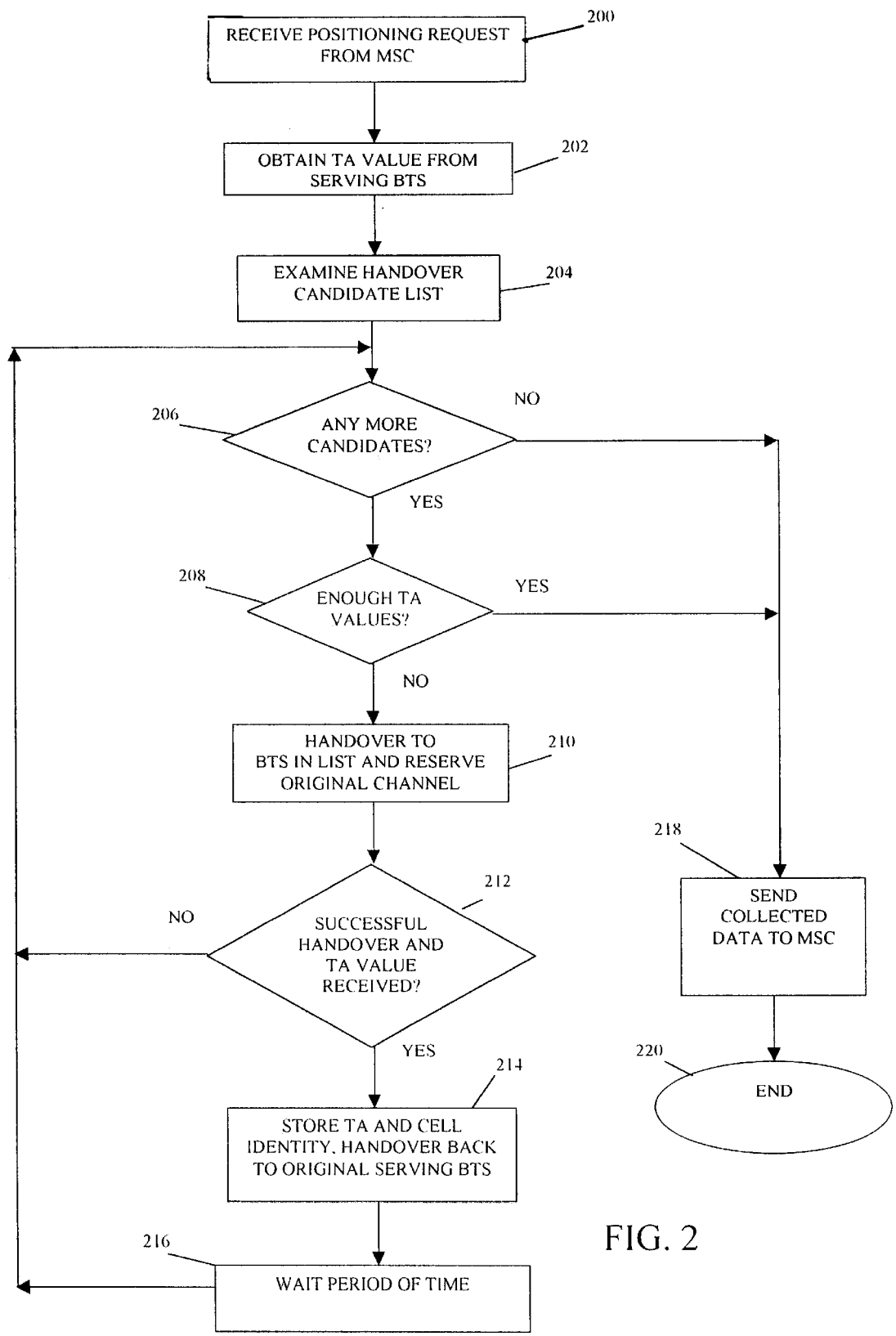
FIG. 2 is a flow chart of operation according to one embodiment of this method.

Turning now to FIG. 2, a flow chart of processing according to the first exemplary method is shown. In FIG. 2, processing starts at action box 200 when a positioning request is received from the MSC. Processing proceeds to action box 202 where the initial TA value is obtained from the serving BTS. Processing continues to action box 204 where the handover candidate list for the mobile station is examined. Advantageously, the handover candidate list is examined from the best serving BTS to the poorest serving BTS. Processing continues to decision diamond 206 where a determination is made whether there are any more candidates on the handover candidate list that have not been used for a positioning handover. If there are candidates, then processing proceeds to decision diamond 208. In decision diamond 208, a determination is made whether enough TA values have been obtained. At least three TA values (including the TA value from the serving BTS) must be obtained. For greater accuracy, more TA values are obtained.

If more TA values are required, processing continues to action box 210 where a handover is made to the next BTS in the handover list. As part of the handover, this BTS derives a TA value. Processing proceeds to decision diamond 212, where a determination is made whether a successful handover was completed and a TA value received. If not, processing loops back to decision diamond 206, and the next BTS on the candidate list is selected for handover.

If the handover was successful and the TA value obtained, processing proceeds to action box 214, where the BSC stores the TA value and the BTS identity. The mobile station is then handed back to the original serving BTS, which has advantageously reserved the original channel for this purpose. Processing then waits in action box 216 for a period of time to prevent several handovers in a row, which may disrupt a call or annoy the user. Processing returns to decision diamond 206 and the next BTS on the candidate list is selected and the steps of handover/hand back are repeated. When there are no more BTS's on the handover candidate list, or if enough TA values have been obtained, processing proceeds to action box 218 where the collected data is sent to the MSC. The MSC forwards the collected data to the MPC, which then calculates the mobile station's geographical position. Processing ends in oval 220.

Figure 3:
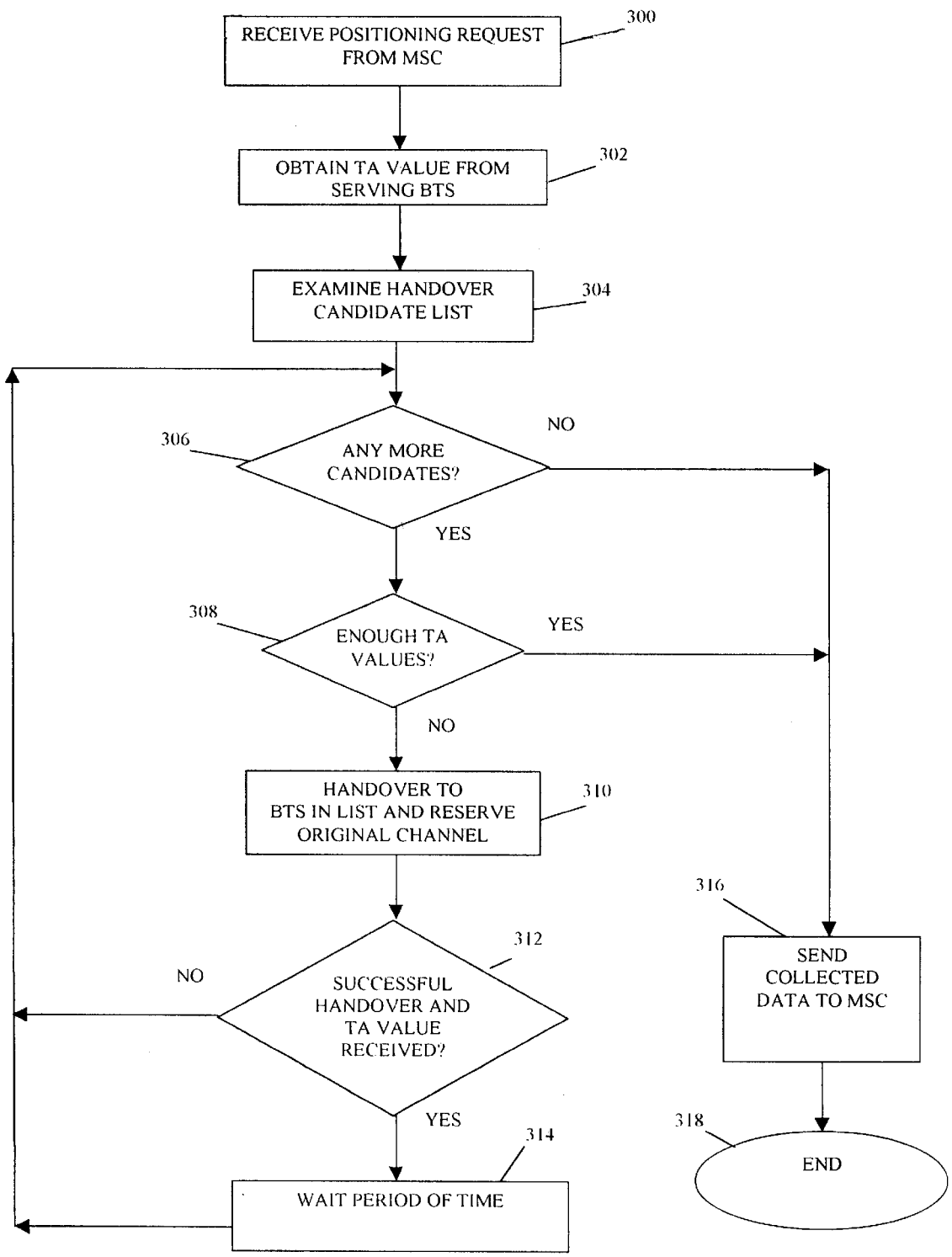
FIG. 3 is a flow chart according to a further embodiment of this method.

FIG. 3 illustrates the second method. Processing starts in action box 300 when the MSC requests that the BSC collect TA values for a mobile station. Processing proceeds to action box 302 where the BSC obtains the TA value from the serving BTS. Next, in action box 304, the best serving BTS on the handover candidate list is selected. Processing continues to decision diamond 306 where a determination is made whether there are any more candidates on the handover candidate list that have not been used for a handover. If there are further candidates, processing proceeds to decision diamond 308. In decision diamond 308, a determination is made whether enough TA values have been obtained. At least three TA values (including the TA value from the serving BTS) must be obtained. For greater accuracy, more TA values are obtained.

If not enough TA values were obtained, processing continues to action box 310 where a handover is made to the next BTS in the handover list. As part of this handover procedure, the BTS derives a TA value. Processing proceeds to decision diamond 312, where a determination is made whether a successful handover was completed and a TA value received. If not, processing loops back to decision diamond 306, and the next BTS on the candidate list is selected for handover.

If the handover were successful and the TA value obtained in decision diamond 312, processing then proceeds to action box 314, where the TA value and the BTS's identity are stored. Processing then waits in action box 314 for a period of time. Processing returns to decision diamond 306 and continues as above. When there are no more BTS's on the handover candidate list, or if enough TA values have been obtained, then processing proceeds to action box 316 where the collected data is sent to the MSC. Processing ends in oval 318.

It is to be understood that many variations may be devised upon the above invention disclosure and that the invention is only to be limited by the scope of the claims.

What is claimed is:

1. In a wireless network having a plurality of base transceiver stations for transmitting and receiving radio signals to and from a mobile station which is communicating with a serving base station and may be handed over to another base station, a method of deriving time values for the mobile station with respect to a plurality of base stations, which comprises the sequential steps of:

acquiring a timing value from said serving base transceiver station;

initiating a first handover of said mobile station from said serving base transceiver station to a first of said plurality of base transceiver stations;

acquiring a second timing value from said first of said plurality of base transceiver stations;

completing said first handover;

initiating a second handover of said mobile station from said first of said plurality of base transceiver stations to said serving base transceiver station;

completing said second handover;

initiating a third handover of said mobile station from said serving base transceiver station to a second of said plurality of base transceiver stations;

acquiring a third timing value from said second of said plurality of base transceiver stations; and completing said third handover.

2. A method in accordance with claim 1 wherein a handover candidate list of base transceiver stations that said mobile station may be handed off to is maintained in said wireless network, further including the step of:

selecting said first and said second base transceiver stations from said handover candidate list.

3. A method in accordance with claim 2 wherein said handover candidate list is rank ordered from a best candidate base transceiver station to a poorest candidate base transceiver station, where said selecting comprises sequentially examining said handover candidate list from said best candidate base transceiver to said poorest candidate base transceiver station.

4. A method in accordance with claim 1 further including waiting for a period of time between handovers.

5. A method in accordance with claim 4 wherein said period of time comprises 480 ms.

6. A method in accordance with claim 1 wherein said wireless network includes a mobile positioning center that calculates locations of mobile stations, said method further including sending said acquired timing values and an identification of said serving base transceiver station, said first base transceiver station and said second base transceiver station.

7. A method in accordance with claim 1 wherein an additional number of timing values are acquired by:
   (a) initiating a handover of said mobile station to said serving base transceiver station;
   (b) initiating a further handover of said mobile station to a further base transceiver station;
   (c) acquiring an additional timing value from said further base transceiver station;
   (d) completing said handover; and
   (e) repeating steps (a) to (d) said additional number of times.

8. A method in accordance with claim 7 wherein said additional number comprises four.

9. The method of claim 1 wherein said step of initiating a first handover includes the step of said serving base transceiver station reserving one channel for the use by said mobile station.

10. The method of claim 9 wherein said step of initiating a third handover includes the step of said serving base transceiver station reserving one channel for the use by said mobile station.

11. The method of claim 1 wherein said steps of initiating a first and second handover are performed by first completing a successful handover from a first base transceiver station to a second base transceiver station and then completing a successful handover from the second base transceiver station to a third base transceiver station.

12. The method of claim 1 wherein said steps of initiating a first and second handover include the steps of:
   first completing a successful handover from a first base transceiver station to a second base transceiver station;
   then completing a successful handover from the second base transceiver station to the first base transceiver station;
   then completing a successful handover from the first base transceiver station to a third base transceiver station; and
   then completing a successful handover from said third base transceiver station to the first base transceiver station.

* * * * *